US010504419B2

(12) United States Patent
Xi et al.

(10) Patent No.: US 10,504,419 B2
(45) Date of Patent: Dec. 10, 2019

(54) DATA CONVERTING METHOD AND APPARATUS, AND COMPUTER-READABLE STORAGE MEDIUM

(71) Applicant: BOE Technology Group Co., Ltd., Beijing (CN)

(72) Inventors: Yanhui Xi, Beijing (CN); Xiaomang Zhang, Beijing (CN); Bin Dai, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 15/941,441

(22) Filed: Mar. 30, 2018

(65) Prior Publication Data

US 2019/0073941 A1 Mar. 7, 2019

(30) Foreign Application Priority Data

Sep. 1, 2017 (CN) .......................... 2017 1 0780518

(51) Int. Cl.

| | |
|---|---|
| ***G09G 3/20*** | (2006.01) |
| ***G09G 5/02*** | (2006.01) |
| ***H04N 1/60*** | (2006.01) |
| ***H04N 5/202*** | (2006.01) |

(52) U.S. Cl.

CPC ......... *G09G 3/2096* (2013.01); *G09G 3/2003* (2013.01); *G09G 2340/0457* (2013.01)

(58) Field of Classification Search

CPC combination set(s) only.
See application file for complete search history.

(56) References Cited

U.S. PATENT DOCUMENTS 5,461,503 A * 10/1995 Deffontaines ..... G02F 1/133514 349/109
9,507,458 B2 * 11/2016 Yoshida .............. G06F 3/04883
2003/0151568 A1 * 8/2003 Ozawa ..................... G09G 3/30 345/82
2008/0055500 A1 * 3/2008 Maeda ............... G02B 27/2214 349/15
2017/0116910 A1 * 4/2017 Miao .................... G09G 3/2092

* cited by examiner

*Primary Examiner* — Wesner Sajous

(74) *Attorney, Agent, or Firm* — Nath, Goldberg & Meyer; Joshua B. Goldberg; Daniel Bissing

(57) ABSTRACT

Data converting method comprises: acquiring, from original image data, multiple pixel data sets each comprising pixel value of each real RGB pixel in two adjacent pixel rows among multiple pixel rows of original image displayed on real RGB display panel according to the original image data; determining BV3 pixel row corresponding to each pixel data set from multiple BV3 pixel rows in target BV3 image to be generated; for each pixel data set, determining effective sub-pixels from real RGB pixels associated with the pixel data set according to arrangement of BV3 pixels in the BV3 pixel row corresponding to the pixel data set; for each pixel data set, determining pixel value of each BV3 pixel in the BV3 pixel row corresponding to the pixel data set in the target BV3 image based on the pixel data set and pixel values of the effective sub-pixels determined for the pixel data set.

17 Claims, 5 Drawing Sheets

DATA CONVERTING METHOD AND APPARATUS, AND COMPUTER-READABLE STORAGE MEDIUM

CROSS-REFERENCE TO RELATED APPLICATION

This application claims priority to Chinese Patent Application No. 201710780518.5, filed on Sep. 1, 2017, the contents of which are incorporated herein by reference in the entirety.

TECHNICAL FIELD

The present application relates to the field of display, and particularly relates to a data converting method, a data converting apparatus, and a computer-readable storage medium.

BACKGROUND

With the development of the display technology, resolution of a display panels become higher and higher, and the high resolution of the display panel results in large amount of data of an image displayed on the display panel, making the transmission difficult. In order to solve the problem of difficult transmission due to large amount of image data caused by the high resolution of the display panel, related art provides Bright View III (BV3 for short) display panel.

SUMMARY

Embodiments of the present disclosure provide a data converting method, a data converting apparatus, and a computer-readable storage medium for converting image data applicable to a conventional real RGB display panel into image data that can be applicable to a BV3 display panel.

In a first aspect, there is provided a data converting method, including:

acquiring a plurality of pixel data sets from original image data, wherein each of the plurality of pixel data sets includes a pixel value of each real RGB pixel in two adjacent pixel rows among a plurality of pixel rows of an original image, the original image is an image displayed on a real RGB display panel according to the original image data, and the original image includes a plurality of real RGB pixels arranged in the plurality of pixel rows and a plurality of pixel columns according to an arrangement manner of real RGB pixels;

determining a BV3 pixel row corresponding to each of the plurality of pixel data sets from a plurality of BV3 pixel rows in a target BV3 image to be generated, wherein the target BV3 image to be generated includes a plurality of BV3 pixels arranged in the plurality of BV3 pixel rows and a plurality of BV3 pixel columns according to an arrangement manner of BV3 pixels, and each of the plurality of BV3 pixel rows corresponds to one of the plurality of pixel data sets;

for each of the plurality of pixel data sets, determining effective sub-pixels from the real RGB pixels associated with the pixel data set according to the arrangement manner of the BV3 pixels in the BV3 pixel row corresponding to the pixel data set; and for each of the plurality of pixel data sets, determining a pixel value of each BV3 pixel in the BV3 pixel row corresponding to the pixel data set in the target BV3 image, based on the pixel data set and pixel values of the effective sub-pixels determined for the pixel data set.

Optionally, the plurality of pixel rows in the original image and the plurality of BV3 pixel rows in the target BV3 image are sequentially numbered, respectively, each of the plurality of pixel rows in the original image has a first row number for indicating an arrangement position of the pixel row in the plurality of pixel rows of the original image, each of the plurality of BV3 pixel rows in the target BV3 image has a second row number for indicating an arrangement position of the BV3 pixel row in the plurality of BV3 pixel rows of the target BV3 image, and the two adjacent pixel rows associated with each of the plurality of pixel data sets include a first pixel row whose first row number is an odd number and a second pixel row whose first row number is the first row number of the first pixel row plus one. The step of determining the BV3 pixel row corresponding to each of the plurality of pixel data sets from the plurality of BV3 pixel rows in the target BV3 image to be generated includes following steps executed for each of the plurality of pixel data sets: acquiring the first row number of the second pixel row associated with the pixel data set; determining, in the target BV3 image, a target BV3 pixel row whose second row number is equal to one half of the first row number of the second pixel row; and determining the target BV3 pixel row to be the BV3 pixel row corresponding to the pixel data set.

Optionally, each of the BV3 pixel rows includes a plurality of BV3 pixels, and includes a first BV3 sub-pixel row and a second BV3 sub-pixel row, each of the plurality of BV3 pixels includes a plurality of BV3 sub-pixels in the first BV3 sub-pixel row and the second BV3 sub-pixel row, the two adjacent pixel rows associated with each of plurality of pixel data sets include a first pixel row and a second pixel row whose first row number is the first row number of the first pixel row plus one, and each of the plurality of BV3 pixels in each of the BV3 pixel rows corresponds to one real RGB pixel in each of the first pixel row and the second pixel row associated with the pixel data set corresponding to the BV3 pixel row. The step of determining the effective sub-pixels from the real RGB pixels associated with the pixel data set according to the arrangement manner of the BV3 pixels in the BV3 pixel row includes following steps executed for each of the plurality of pixel data sets: determining, from the BV3 pixel row corresponding to the pixel data set, a BV3 pixel corresponding to each of the real RGB pixels associated with the pixel data set; for each of the real RGB pixels associated with the pixel data set, determining a first BV3 sub-pixel and a second BV3 sub-pixel from the BV3 pixel corresponding to the real RGB pixel, the first BV3 sub-pixel being in the first BV3 sub-pixel row, and the second BV3 sub-pixel being in the second BV3 sub-pixel row; for each real RGB pixel in the first pixel row of the real RGB pixels associated with the pixel data set, determining a real RGB sub-pixel in the real RGB pixel having the same color as the first BV3 sub-pixel to be one of the effective sub-pixels; and for each real RGB pixel in the second pixel row of the real RGB pixels associated with the pixel data set, determining a real RGB sub-pixel in the real RGB pixel having the same color as the second BV3 sub-pixel to be one of the effective sub-pixels.

Optionally, the plurality of pixel columns in the original image and the plurality of BV3 pixel columns in the target BV3 image are sequentially numbered, respectively, each of the plurality of pixel columns in the original image has a first column number for indicating an arrangement position of the pixel column in the plurality of pixel columns of the original image, and each of the plurality of BV3 pixel columns in the target BV3 image has a second column number for indicating an arrangement position of the BV3 pixel column in the plurality of BV3 pixel columns of the target BV3 image. The step of determining the BV3 pixel corresponding to each of the real RGB pixels associated with the pixel data set includes: determining the first column number of the pixel column in which the real RGB pixel is arranged; determining a target BV3 pixel in the BV3 pixel row corresponding to the pixel data set, the second column number of the BV3 pixel column in which the target BV3 pixel is arranged being equal to the first column number of the pixel column in which the real RGB pixel is arranged; and determining the target BV3 pixel to be the BV3 pixel corresponding to the real RGB pixel.

Optionally, each of the plurality of real RGB pixels includes a red real RGB sub-pixel, a green real RGB sub-pixel, and a blue real RGB sub-pixel, and the two adjacent pixel rows associated with each of the plurality of pixel data sets include a first pixel row and a second pixel row whose first row number is the first row number of the first pixel row plus one. The step of determining the pixel value of each BV3 pixel in the BV3 pixel row corresponding to the pixel data set in the target BV3 image based on the pixel data set and pixel values of the effective sub-pixels determined for the pixel data set includes following steps executed for each real RGB pixel, as a first real RGB pixel, in one of the first pixel row and the second pixel row associated with the pixel data set: acquiring pixel values of the red real RGB sub-pixel, the green real RGB sub-pixel and the blue real RGB sub-pixel of the first real RGB pixel; acquiring pixel values of the red real RGB sub-pixel, the green real RGB sub-pixel and the blue real RGB sub-pixel of a second real RGB pixel, the second real RGB pixel being in the other of the first pixel row and the second pixel row associated with the pixel data set and being in the same column as the first real RGB sub-pixel; calculating a target red sub-pixel value based on the pixel values of the red real RGB sub-pixels of the first real RGB pixel and the second real RGB pixel using a preset algorithm; calculating a target green sub-pixel value based on the pixel values of the green real RGB sub-pixels of the first real RGB pixel and the second real RGB pixel using the preset algorithm; calculating a target blue sub-pixel value based on the pixel values of the blue real RGB sub-pixels of the first real RGB pixel and the second real RGB pixel using the preset algorithm; calculating a pixel value of the BV3 pixel corresponding to both the first real RGB pixel and the second real RGB pixel in the BV3 pixel row corresponding to the pixel data set based on the target red sub-pixel value, the target green sub-pixel value, the target blue sub-pixel value, and pixel values of target effective sub-pixels, the target effective sub-pixels being one of the effective sub-pixels determined from the first real RGB pixel and the second real RGB pixel.

Optionally, the preset algorithm is one of an averaging algorithm, a bi-linear algorithm, a bi-cubic algorithm, and a polyfilter algorithm.

Optionally, the target effective sub-pixels include a red effective sub-pixel, a green effective sub-pixel, and a blue effective sub-pixel, and the step of calculating the pixel value of the BV3 pixel corresponding to both the first real RGB pixel and the second real RGB pixel in the BV3 pixel row corresponding to the pixel data set based on the target red sub-pixel value, the target green sub-pixel value, the target blue sub-pixel value, and the pixel values of the target effective sub-pixels includes:

calculating the pixel value of the red BV3 sub-pixel in the BV3 pixel corresponding to both the first real RGB pixel and the second real RGB pixel based on the target red sub-pixel value and the pixel value of the red effective sub-pixel by using a first formula, the first formula being:

$$RR_1=\alpha R_1+(1-\alpha)r;$$

calculating the pixel value of the green BV3 sub-pixel in the BV3 pixel corresponding to both the first real RGB pixel and the second real RGB pixel based on the target green sub-pixel value and the pixel value of the green effective sub-pixel by using a second formula, the second formula being:

$$GG_1=\alpha G_1+(1-\alpha)g;$$

calculating the pixel value of the blue BV3 sub-pixel in the BV3 pixel corresponding to both the first real RGB pixel and the second real RGB pixel based on the target blue sub-pixel value and the pixel value of the blue effective sub-pixel by using a third formula, the third formula being:

$$BB_1=\alpha B_1+(1-\alpha)b;$$

where $RR_1$ is the pixel value of the red BV3 sub-pixel in the BV3 pixel corresponding to both the first real RGB pixel and the second real RGB pixel, $GG_1$ is the pixel value of the green BV3 sub-pixel in the BV3 pixel corresponding to both the first real RGB pixel and the second real RGB pixel, $BB_1$ is the pixel value of the blue BV3 sub-pixel in the BV3 pixel corresponding to both the first real RGB pixel and the second real RGB pixel, $\alpha$ is a preset weight coefficient greater than 0 and less than 1, $R_1$ is the pixel value of the red effective sub-pixel, r is the target red sub-pixel value, $G_1$ is the pixel value of the green effective sub-pixel, g is the target green sub-pixel value, $B_2$ is the pixel value of the blue effective sub-pixel, and b is the target blue sub-pixel value.

Optionally, after the step of determining, for each of the plurality of pixel data sets, the pixel value of each BV3 pixel in the BV3 pixel row corresponding to the pixel data set in the target BV3 image based on the pixel data set and pixel values of the effective sub-pixels determined for the pixel data set, the method further includes displaying the target BV3 image on a BV3 display panel according to the pixel value of each BV3 pixel in the target BV3 image.

In a second aspect, there is provided a data converting apparatus including a memory and a processor coupled to the memory. The memory stores computer-executable instructions which can be executed by the processor to instruct the processor to:

acquire a plurality of pixel data sets from original image data, wherein each of the plurality of pixel data sets includes a pixel value of each real RGB pixel in two adjacent pixel rows among a plurality of pixel rows of an original image, the original image is an image displayed on a real RGB display panel according to the original image data, and the original image includes a plurality of real RGB pixels arranged in the plurality of pixel rows and a plurality of pixel columns according to an arrangement manner of real RGB pixels;

determine a BV3 pixel row corresponding to each of the plurality of pixel data sets from a plurality of BV3 pixel rows in a target BV3 image to be generated, wherein the target BV3 image to be generated includes a plurality of BV3 pixels arranged in the plurality of BV3 pixel rows and a plurality of BV3 pixel columns according to an arrangement manner of BV3 pixels, and each of the plurality of BV3 pixel rows corresponds to one of the plurality of pixel data sets;

for each of the plurality of pixel data sets, determine effective sub-pixels from the real RGB pixels associated with the pixel data set according to the arrangement manner of the BV3 pixels in the BV3 pixel row corresponding to the pixel data set; and for each of the plurality of pixel data sets, determine a pixel value of each BV3 pixel in the BV3 pixel row corresponding to the pixel data set in the target BV3 image, based on the pixel data set and pixel values of the effective sub-pixels determined for the pixel data set.

Optionally, the plurality of pixel rows in the original image and the plurality of BV3 pixel rows in the target BV3 image are sequentially numbered, respectively, each of the plurality of pixel rows in the original image has a first row number for indicating an arrangement position of the pixel row in the plurality of pixel rows of the original image, each of the plurality of BV3 pixel rows in the target BV3 image has a second row number for indicating an arrangement position of the BV3 pixel row in the plurality of BV3 pixel rows of the target BV3 image, and the two adjacent pixel rows associated with each of the plurality of pixel data sets include a first pixel row whose first row number is an odd number and a second pixel row whose first row number is the first row number of the first pixel row plus one. The processor executes the computer-executable instructions to execute the step of determining the BV3 pixel row corresponding to each of the plurality of pixel data sets, including following steps executed for each of the plurality of pixel data sets: acquiring the first row number of the second pixel row associated with the pixel data set; determining, in the target BV3 image, a target BV3 pixel row whose second row number of the target BV3 pixel row is equal to one half of the first row number of the second pixel row; and determining the target BV3 pixel row to be the BV3 pixel row corresponding to the pixel data set.

Optionally, each of the BV3 pixel rows includes a plurality of BV3 pixels, and includes a first BV3 sub-pixel row and a second BV3 sub-pixel row, and each of the plurality of BV3 pixels includes a plurality of BV3 sub-pixels in the first BV3 sub-pixel row and the second BV3 sub-pixel row, the two adjacent pixel rows associated with each of plurality of pixel data sets including a first pixel row and a second pixel row whose first row number is the first row number of the first pixel row plus one, and each of the plurality of BV3 pixels in each of the BV3 pixel rows corresponds to one real RGB pixel in each of the first pixel row and the second pixel row associated with the pixel data set corresponding to the BV3 pixel row. The processor executes the computer-executable instructions to execute the step of determining the effective sub-pixels, including following steps executed for each of the plurality of pixel data sets: determining, from the BV3 pixel row corresponding to the pixel data set, a BV3 pixel corresponding to each of the real RGB pixels associated with the pixel data set; for each of the real RGB pixels associated with the pixel data set, determining a first BV3 sub-pixel and a second BV3 sub-pixel from the BV3 pixel corresponding to the real RGB pixel, the first BV3 sub-pixel being in the first BV3 sub-pixel row, and the second BV3 sub-pixel being in the second BV3 sub-pixel row; for each real RGB pixel in the first pixel row of the real RGB pixels associated with the pixel data set, determining a real RGB sub-pixel in the real RGB pixel having the same color as the first BV3 sub-pixel to be one of the effective sub-pixels; and for each real RGB pixel in the second pixel row of the real RGB pixels associated with the pixel data set, determining a real RGB sub-pixel in the real RGB pixel having the same color as the second BV3 sub-pixel to be one of the effective sub-pixels.

Optionally, the plurality of pixel columns in the original image and the plurality of BV3 pixel columns in the target BV3 image are sequentially numbered, respectively, each of the plurality of pixel columns in the original image has a first column number for indicating an arrangement position of the pixel column in the plurality of pixel columns of the original image, and each of the plurality of BV3 pixel columns in the target BV3 image has a second column number for indicating an arrangement position of the BV3 pixel column in the plurality of BV3 pixel columns of the target BV3 image. The processor executes the computer-executable instructions to execute the step of determining the BV3 pixel corresponding to each of the real RGB pixels associated with the pixel data set, including: determining the first column number of the pixel column in which the real RGB pixel is arranged; determining a target BV3 pixel in the BV3 pixel row corresponding to the pixel data set, the second column number of the BV3 pixel column in which the target BV3 pixel is arranged being equal to the first column number of the pixel column in which the real RGB pixel is arranged; and determining the target BV3 pixel to be the BV3 pixel corresponding to the real RGB pixel.

Optionally, each of the plurality of real RGB pixels includes a red real RGB sub-pixel, a green real RGB sub-pixel, and a blue real RGB sub-pixel, and the two adjacent pixel rows associated with each of the plurality of pixel data sets include a first pixel row and a second pixel row whose first row number is the first row number of the first pixel row plus one. The processor executes the computer-executable instructions to execute the step of determining the pixel value of each BV3 pixel in the BV3 pixel row corresponding to the pixel data set, including following steps executed for each real RGB pixel, as a first real RGB pixel, in one of the first pixel row and the second pixel row associated with the pixel data set: acquiring pixel values of the red real RGB sub-pixel, the green real RGB sub-pixel and the blue real RGB sub-pixel of the first real RGB pixel; acquiring pixel values of the red real RGB sub-pixel, the green real RGB sub-pixel and the blue real RGB sub-pixel of a second real RGB pixel, the second real RGB pixel being in the other of the first pixel row and the second pixel row associated with the pixel data set and being in the same column as the first real RGB sub-pixel; calculating a target red sub-pixel value based on the pixel values of the red real RGB sub-pixels of the first real RGB pixel and the second real RGB pixel using a preset algorithm; calculating a target green sub-pixel value based on the pixel values of the green real RGB sub-pixels of the first real RGB pixel and the second real RGB pixel using the preset algorithm; calculating a target blue sub-pixel value based on the pixel values of the blue real RGB sub-pixels of the first real RGB pixel and the second real RGB pixel using the preset algorithm; calculating the pixel value of the BV3 pixel corresponding to both the first real RGB pixel and the second real RGB pixel in the BV3 pixel row corresponding to the pixel data set based on the target red sub-pixel value, the target green sub-pixel value, the target blue sub-pixel value, and pixel values of target effective sub-pixels, the target effective sub-pixels being the effective sub-pixels determined from the first real RGB pixel and the second real RGB pixel.

Optionally, the preset algorithm is one of an averaging algorithm, a bi-linear algorithm, a bi-cubic algorithm, and a polyfilter algorithm.

Optionally, the target effective sub-pixels include a red effective sub-pixel, a green effective sub-pixel, and a blue effective sub-pixel. The processor executes the step of calculating the pixel value of the BV3 pixel corresponding to both the first real RGB pixel and the second real RGB pixel, and the step includes:

calculating the pixel value of the red BV3 sub-pixel in the BV3 pixel corresponding to both the first real RGB pixel and the second real RGB pixel based on the target red sub-pixel value and the pixel value of the red effective sub-pixel by using a first formula, the first formula being:

$$RR_1=\alpha R_1+(1-\alpha)r;$$

calculating the pixel value of the green BV3 sub-pixel in the BV3 pixel corresponding to both the first real RGB pixel and the second real RGB pixel based on the target green sub-pixel value and the pixel value of the green effective sub-pixel by using a second formula, the second formula being:

$$GG_1=\alpha G_1+(1-\alpha)g;$$

calculating the pixel value of the blue BV3 sub-pixel in the BV3 pixel corresponding to both the first real RGB pixel and the second real RGB pixel based on the target blue sub-pixel value and the pixel value of the blue effective sub-pixel by using a third formula, the third formula being:

$$BB_1=\alpha B_1+(1-\alpha)b;$$

where $RR_1$ is the pixel value of the red BV3 sub-pixel in the BV3 pixel corresponding to both the first real RGB pixel and the second real RGB pixel, $GG_1$ is the pixel value of the green BV3 sub-pixel in the BV3 pixel corresponding to both the first real RGB pixel and the second real RGB pixel, $BB_1$ is the pixel value of the blue BV3 sub-pixel in the BV3 pixel corresponding to both the first real RGB pixel and the second real RGB pixel, $\alpha$ is a preset weight coefficient greater than 0 and less than 1, $R_1$ is the pixel value of the red effective sub-pixel, r is the target red sub-pixel value, $G_1$ is the pixel value of the green effective sub-pixel, g is the target green sub-pixel value, $B_2$ is the pixel value of the blue effective sub-pixel, and b is the target blue sub-pixel value.

Optionally, the apparatus further includes a display device configured to display the target BV3 image on a BV3 display panel according to the pixel value of each BV3 pixel in the target BV3 image.

In a third aspect, there is provided a computer-readable storage medium configured to store a computer program which can be executed by a processor to implement the data converting method according to the first aspect.

BRIEF DESCRIPTION OF THE DRAWINGS

In order to explain technical solutions in the embodiments of the present disclosure more clearly, accompanying drawings used in the description of the embodiments will be briefly described below. Obviously, the drawings described below are merely part of embodiments of the present disclosure, and for those of ordinary skill in the art, other drawings can be obtained based on these drawings without creative efforts.

DETAILED DESCRIPTION

To make the object, technical solutions, and advantages of the present disclosure clearer, implementations of the present disclosure will be further described in detail below with reference to the accompanying drawings.

In order to allow a conventional real RGB display panel to display images correctly, most of the current image data are applicable to the conventional real RGB display panel, and how to convert the image data applicable to a conventional real RGB display panel into image data that can be applicable to a BV3 display panel to ensure that the BV3 display panel can display images correctly has become an urgent problem to be solved.

Accordingly, the present disclosure provides, inter alia, a data converting method, a data converting apparatus, and a computer-readable storage medium that substantially obviate one or more of the problems due to limitations and disadvantages of the related art.

Figure 1A:
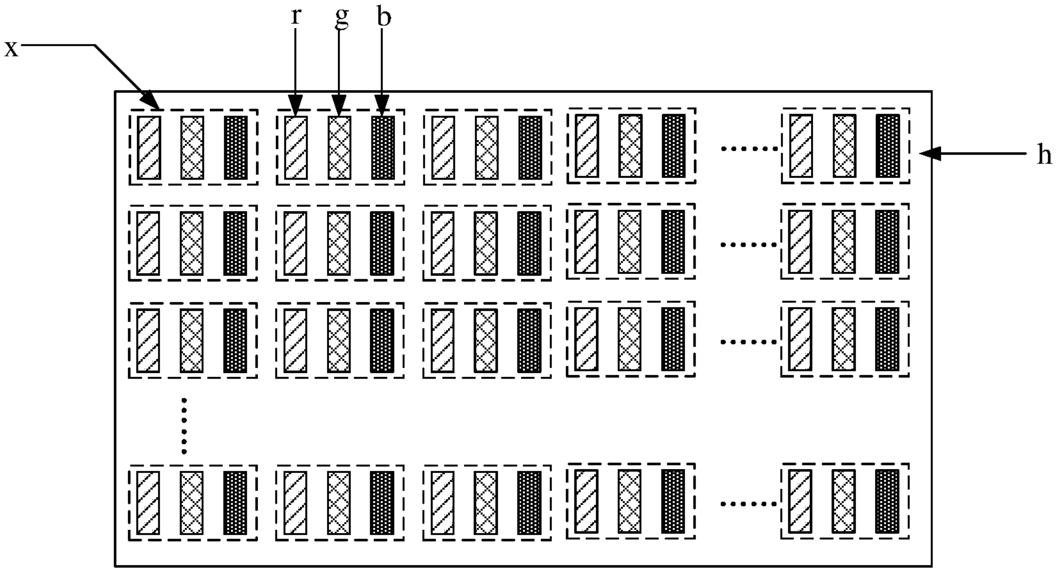
FIG. 1A is a schematic diagram illustrating an arrangement manner of real RGB pixels in a conventional real RGB display panel.

FIG. 1A is a schematic diagram illustrating an arrangement manner of real RGB pixels in a conventional Real RGB display panel (hereinafter referred to as a conventional display panel). In practical applications, an arrangement manner of real RGB pixels in an image corresponding to image data applicable to a conventional display panel (i.e., an image displayed by a conventional display panel according to the image data) is the same as an arrangement manner of the real RGB pixels in the conventional display panel. As shown in FIG. 1A, the conventional display panel includes a plurality of pixel rows h arranged at an equal interval from top to bottom, and each of the plurality of pixel rows h includes a plurality of real RGB pixels x arranged at an equal interval in a row direction, and each of the plurality of real RGB pixels x includes a red real RGB sub-pixel r, a green real RGB sub-pixel g, and a blue real RGB sub-pixel b arranged at an equal interval in the row direction. In practical applications, the pixel rows are generally numbered from top to bottom (i.e., along a scanning direction of data lines) (other numbering manner may also be adopted in practical applications and is not described in detail in the embodiment of the disclosure), and after the numbering, each of the plurality of pixel rows in the conventional display panel may have a first row number that can indicate an arrangement position of the pixel row in the plurality of pixel rows included in the conventional display panel.

Figure 1B:
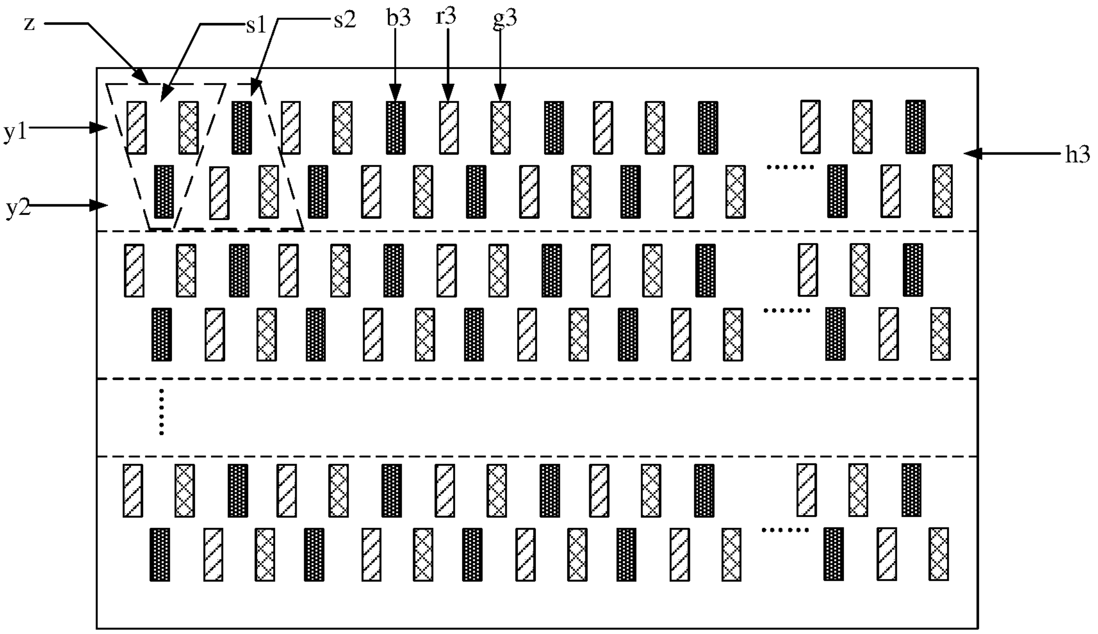
FIG. 1B is a schematic diagram illustrating an arrangement manner of BV3 pixels in a BV3 display panel.

FIG. 1B is a schematic diagram illustrating an arrangement manner of BV3 pixels in a BV3 display panel. In practical applications, an arrangement manner of BV3 pixels in an image corresponding to image data applicable to a BV3 display panel (i.e., a BV3 image displayed by a BV3 display panel according to the image data) is the same as an arrangement manner of the BV3 pixels in the BV3 display panel. As shown in FIG. 1B, the BV3 display panel includes a plurality of BV3 pixel rows h3 arranged at an equal interval from top to bottom, each of the plurality of BV3 pixel rows h3 includes a plurality of BV3 pixel sets Z, and each of the plurality of BV3 pixel sets Z includes a first BV3 pixel s1 and a second BV3 pixel s2. Each of the plurality of BV3 pixel rows h3 includes a first sub-pixel row y1 and a second sub-pixel row y2 next to the first sub-pixel row y1. In an embodiment of the present disclosure, in the first BV3 pixel s1, a red BV3 sub-pixel r3 and a green BV3 sub-pixel g3 are in the first sub-pixel row y1, and a blue BV3 sub-pixel b3 is in the second sub-pixel row y2; and in the second BV3 pixel s2, a red BV3 sub-pixel r3 and a green BV3 sub-pixel g3 are in the second sub-pixel row y2, and a blue BV3 sub-pixel b3 is in the first sub-pixel row y1. In practical application, the BV3 pixel rows in the BV3 display panel may be numbered in the same way as the pixel rows in the conventional display panel, for example, be numbered from top to bottom, and after the numbering, each of the plurality of BV3 pixel rows in the BV3 display panel may have a second row number that can indicate an arrangement position of the BV3 pixel row in the plurality of pixel rows included in the BV3 display panel.

Because there is a big difference in pixel structure between the conventional display panel and the BV3 display panel, in the related art, the BV3 display panel cannot display images according to the image data applicable to the conventional display panel, whereas most of the current image data are image data applicable to the conventional display panel, which results in poor compatibility of the BV3 display panel. In order to improve the compatibility of the BV3 display panel, embodiments of the present disclosure provide a data converting method which can convert image data applicable to a conventional display panel into image data applicable to a BV3 display panel.

It should be noted that the data converting method provided in the embodiments of the present disclosure may be applied to a data converting apparatus. In an embodiment of the present disclosure, the data converting apparatus may be a display device including a BV3 display panel.

Figure 2:
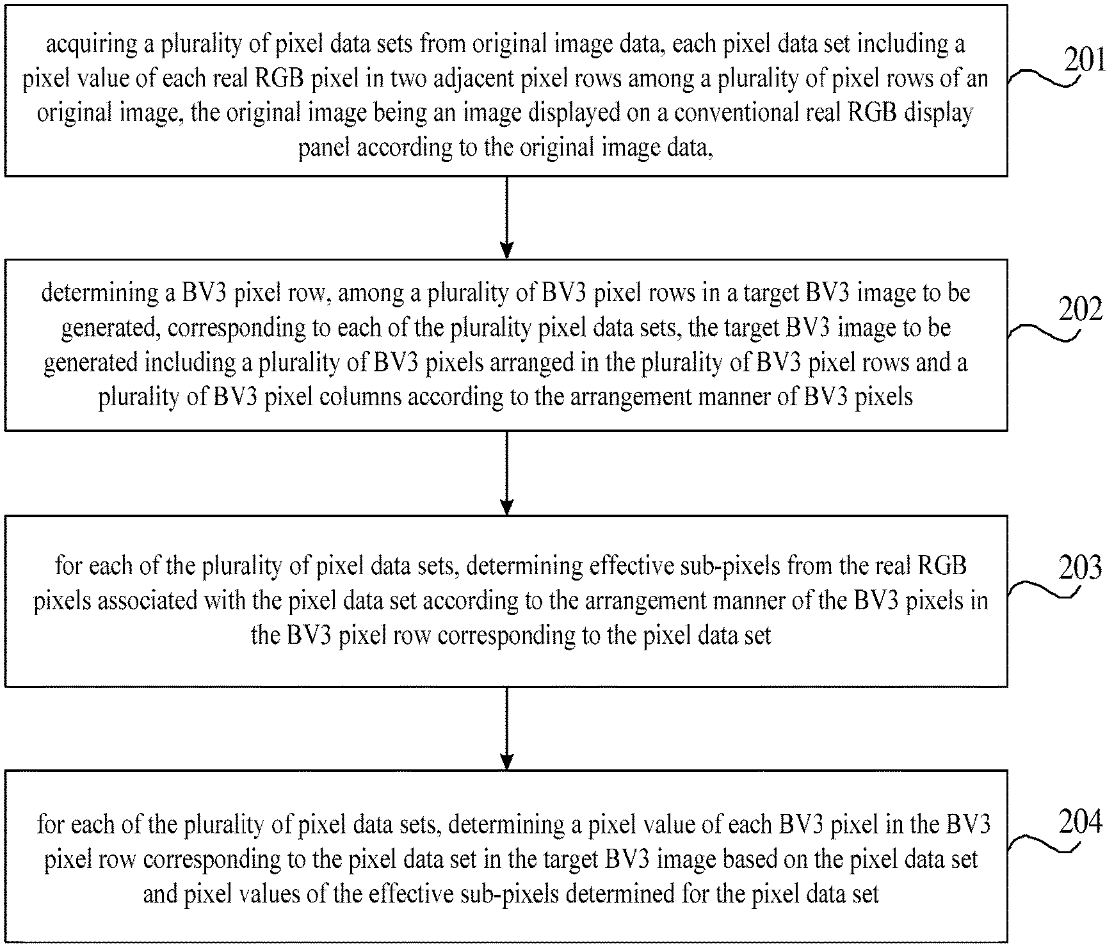
FIG. 2 is a flowchart of a data converting method provided in an embodiment of the present disclosure.

FIG. 2 is a flowchart of a data converting method according to an exemplary embodiment. As shown in FIG. 2, the data converting method may be implemented by a data converting apparatus and includes the following steps 201 to 204.

At step 201, a plurality of pixel data sets are acquired from original image data, each of the plurality of pixel data sets includes a pixel value of each real RGB pixel in two adjacent pixel rows among a plurality of pixel rows of an original image, the original image is an image displayed on a conventional real RGB display panel according to the original image data, and the original image includes a plurality of real RGB pixels arranged in the plurality of pixel rows and a plurality of pixel columns according to the arrangement manner of real RGB pixels.

At step 202, a BV3 pixel row, among a plurality of BV3 pixel rows in a target BV3 image to be generated, corresponding to each of the plurality of pixel data sets is determined, the target BV3 image to be generated includes a plurality of BV3 pixels arranged in the plurality of BV3 pixel rows and a plurality of BV3 pixel columns according to the arrangement manner of BV3 pixels, and each of the plurality of BV3 pixel rows corresponds to one of the plurality of pixel data sets.

At step 203, for each of the plurality of pixel data sets, effective sub-pixels is determined from the real RGB pixels associated with the pixel data set according to the arrangement manner of the BV3 pixels in the BV3 pixel row corresponding to the pixel data set. Here, the real RGB pixels associated with the pixel data set refer to real RGB pixels to which the pixel values included in the pixel data set belong.

At step 204, for each of the plurality of pixel data sets, a pixel value of each BV3 pixel in the BV3 pixel row corresponding to the pixel data set in the target BV3 image is determined based on the pixel data set and pixel values of the effective sub-pixels determined for the pixel data set.

In summary, in the data converting method provided by the embodiment of the present disclosure, a plurality of pixel data sets are acquired from original image data applicable to a conventional real RGB display panel, each pixel data set including pixel value of each real RGB pixel in two adjacent pixel rows in an original image corresponding to the original image data, effective sub-pixels are determined from real RGB pixels corresponding to each of the above pixel data sets, and then a pixel value of each BV3 pixel in a target BV3 image to be generated is determined based on the pixel data set and pixel values of the effective sub-pixels determined for the pixel data set. In this way, the original image data applicable to the conventional real RGB display panel are converted into image data that can be applicable to the BV3 display panel, thereby improving backward compatibility of the BV3 display panel.

Figure 3A:
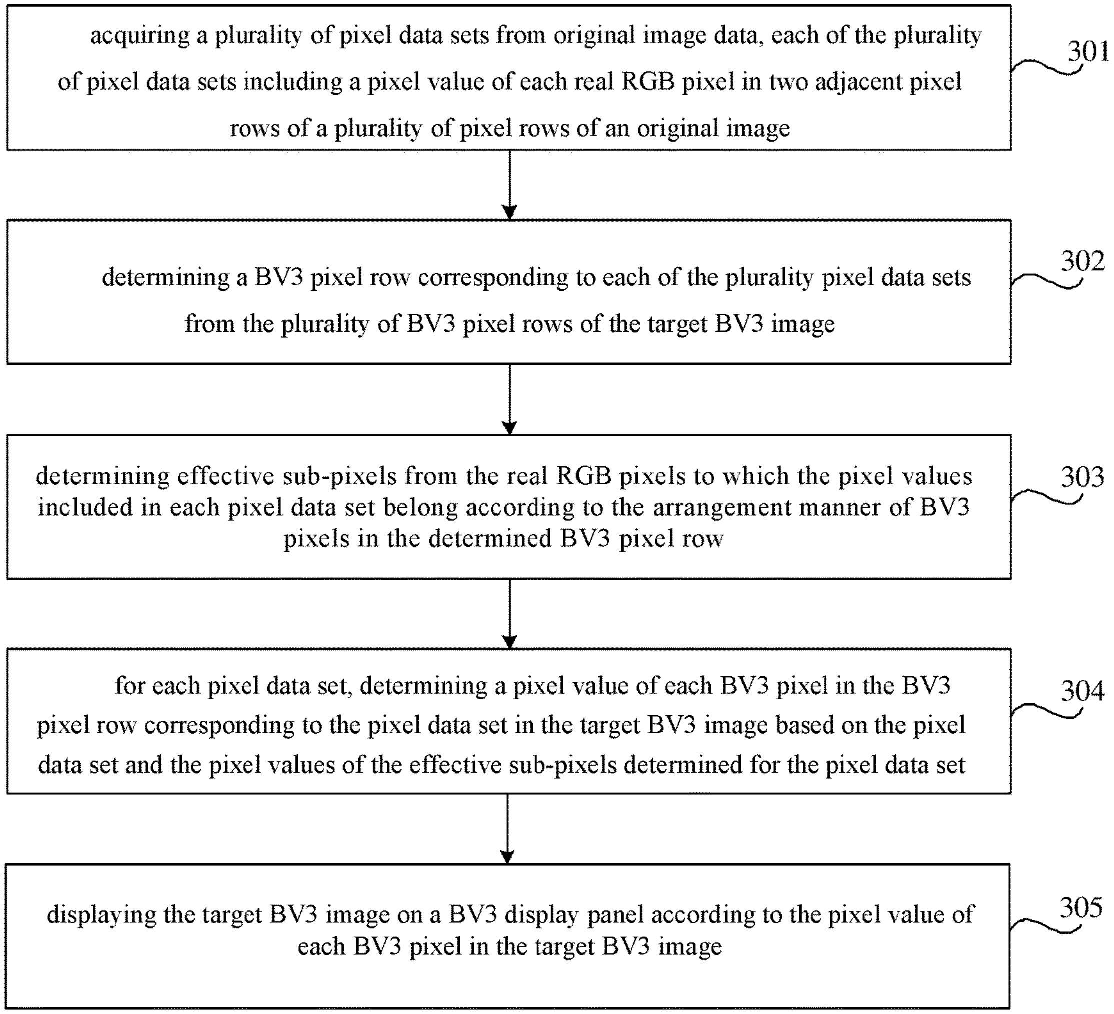
FIG. 3A is a flowchart of a data converting method provided in an embodiment of the present disclosure.

FIG. 3 is a flowchart of a data converting method according to an exemplary embodiment. As shown in FIG. 3, the data converting method may be implemented by a data converting apparatus and includes the following steps 301 to 305.

At step S301, a plurality of pixel data sets are acquired from original image data, each of the plurality of pixel data sets includes a pixel value of each real RGB pixel in two adjacent pixel rows of a plurality of pixel rows of an original image.

The original image data is image data applicable to a conventional real RGB display panel, and the original image is an image displayed on the conventional real RGB display panel according to the original image data. the original image includes a plurality of real RGB pixels, and an arrangement manner of the plurality of real RGB pixels is the same as the arrangement manner of real RGB pixels in the conventional real RGB display panel. In the embodiment of the present disclosure, the data converting apparatus can convert the original image data into image data applicable to the BV3 display panel, and an image displayed by the BV3 display panel using the image data applicable to the BV3 display panel is the target BV3 image. The target BV3 image includes a plurality of BV3 pixels, and an arrangement manner of the BV3 pixels is the same as the arrangement manner of the BV3 pixels in the BV3 display panel.

In an embodiment of the present disclosure, one BV3 pixel row in the target BV3 image may correspond to two adjacent pixel rows in the original image. Therefore, in the process of converting the original image data into image data applicable to the BV3 display panel, the data converting apparatus needs to convert the data (i.e., one pixel data set) corresponding to two adjacent pixel rows in the original image data into the data corresponding to one BV3 pixel row in the image data applicable to the BV3 display panel, and for this purpose, in the embodiment of the present disclosure, the data converting apparatus needs to perform step 301 first.

Figure 3B:
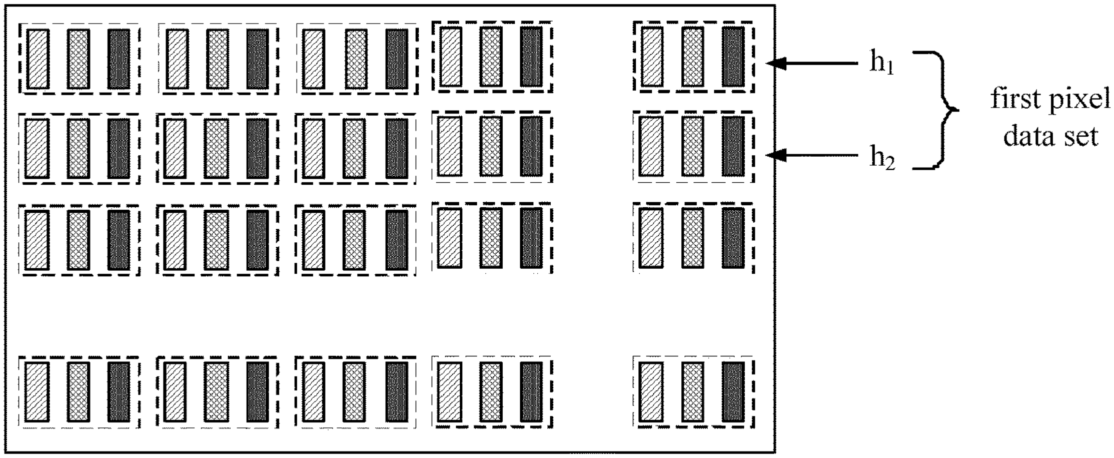
FIG. 3B is a schematic diagram illustrating an original image provided in an embodiment of the present disclosure.

At step 301, the data converting apparatus may divide the original image data into a plurality of pixel data sets each corresponding to two adjacent pixel rows in the original image. The i-th pixel data set in the plurality of pixel data sets corresponds to a first pixel row and a second pixel rows adjacent to each other, the first row number of the first pixel row is 2i−1, and the first row number of the second pixel row is 2i. For example, as shown in FIG. 3B, the first row number of the first pixel row $h_1$ corresponding to the first pixel data set obtained after dividing the original image data by the data converting apparatus is 1, and the first row number of the second pixel row $h_2$ corresponding to the first pixel data set is 2.

At step 302, a BV3 pixel row corresponding to each of the plurality of pixel data sets is determined from the plurality of BV3 pixel rows of the target BV3 image.

It can be known from the foregoing description that, since each pixel data set corresponds to two adjacent pixel rows in the original image, each pixel data set may correspond to one BV3 pixel row in the target BV3 image. For the purpose of converting the original image data into image data for displaying the target BV3 image and applicable to the BV3 display panel, the data converting apparatus needs to determine the BV3 pixel row corresponding to each pixel data set, so as to determine image data of the corresponding BV3 pixel row according to the pixel data set in a subsequent step. Next, a process of step 302 in an embodiment of the present disclosure is described by taking a process of determining the BV3 pixel row corresponding to the first pixel data set in the target BV3 image by the data converting apparatus as an example, the first pixel data set is any of the plurality of pixel data sets of the original image data, and processing methods of other pixel data sets may refer to the processing method of the first pixel data set. As an example, step 302 includes steps a1, b1, and c1 executed for each of the plurality of pixel data sets.

At step a1, the first row number of the second pixel row associated with the first pixel data set is acquired. Here, a pixel row associated with a pixel data set refer to a pixel row of real RGB pixels to which the pixel values included in the pixel data set belong.

In the case shown in FIG. 3B, if the pixel data set is the first pixel data set obtained by dividing the original image data, the data converting apparatus can acquire the first row number of the second pixel row $h_2$ at step a1, and the first row number is 2.

At step b1, a target BV3 pixel row is determined in the target BV3 image, and the second row number of the target BV3 pixel row is equal to one half of the first row number of the second pixel row.

In the case shown in FIG. 3B, the first row number of the second pixel row $h_2$ is 2, and then the data converting apparatus can determine the BV3 pixel row whose second row number is 1 in the target BV3 image to be the target BV3 pixel row.

At step c1, the target BV3 pixel row is determined to be the BV3 pixel row corresponding to the first pixel data set.

At step 303, effective sub-pixels are determined, from the real RGB pixels to which the pixel values included in each pixel data set belong, according to the arrangement manner of BV3 pixels in the determined BV3 pixel row.

In an embodiment of the present disclosure, the number of BV3 pixels included in each BV3 pixel row in the target BV3 image is the same as the number of real RGB pixels included in each pixel row in the original image. The so-called "arrangement manner of BV3 pixels in the BV3 pixel row" at step 303 refers to an arrangement manner of the first BV3 pixel and the second BV3 pixel in each BV3 pixel set in the BV3 pixel row and the arrangement manner of the BV3 sub-pixels in the first BV3 pixel and the second BV3 pixel.

A process of step 303 in an embodiment of the present disclosure is described by taking a process of determining the effective sub-pixels from the real RBG pixels corresponding to the first pixel data set as an example, the first pixel data set is any of the plurality of pixel data sets of the original image data, and a processing method of other pixel data sets may refer to the processing method of the first pixel data set. As an example, step 303 includes steps a2, b2, c2 and d2.

At step a2, a BV3 pixel corresponding to each of the real RGB pixels associated with the first pixel data set is determined from the BV3 pixel row corresponding to the first pixel data set.

In practical applications, in addition to numbering the pixel rows of the conventional display panel and the BV3 pixel rows of the BV3 display panel, the pixel columns of the conventional display panel and the BV3 pixel columns of the BV3 display panel may be numbered in the same order as the pixel rows and the BV3 pixel rows are numbered, and the BV3 pixels in one BV3 pixel column are arranged at a same position in their respective BV3 pixels rows. After the numbering, each pixel column of the conventional display panel has a first column number for indicating an arrangement position of the pixel column in the plurality of pixel columns included in the conventional display panel, and each BV3 pixel column in the BV3 display panel has a second column number for indicating an arrangement position of the BV3 pixel column in the plurality of BV3 pixel columns included in the BV3 display panel.

Next, a process of step a2 in an embodiment of the present disclosure is described by taking a process of determining the BV3 pixel corresponding to a first real RGB pixel as an example. Here, the first real RGB pixel may be any one of the real RGB pixels associated with the first pixel data set, and processing methods of the other real RGB pixels associated with the first pixel data set may refer to the processing method of the first real RGB pixel. As an example, step a2 includes the following steps. The data converting apparatus may determine the first column number of the pixel column in which the first real RGB pixel is arranged and determine a target BV3 pixel in the BV3 pixel row corresponding to the first pixel data set, the second column number of the BV3 pixel column in which the target BV3 pixel is arranged being equal to the first column number of the pixel column in which the real RGB pixel is arranged, and the data converting apparatus determines the target BV3 pixel to be the BV3 pixel corresponding to the first real RGB pixel.

Figure 3C:
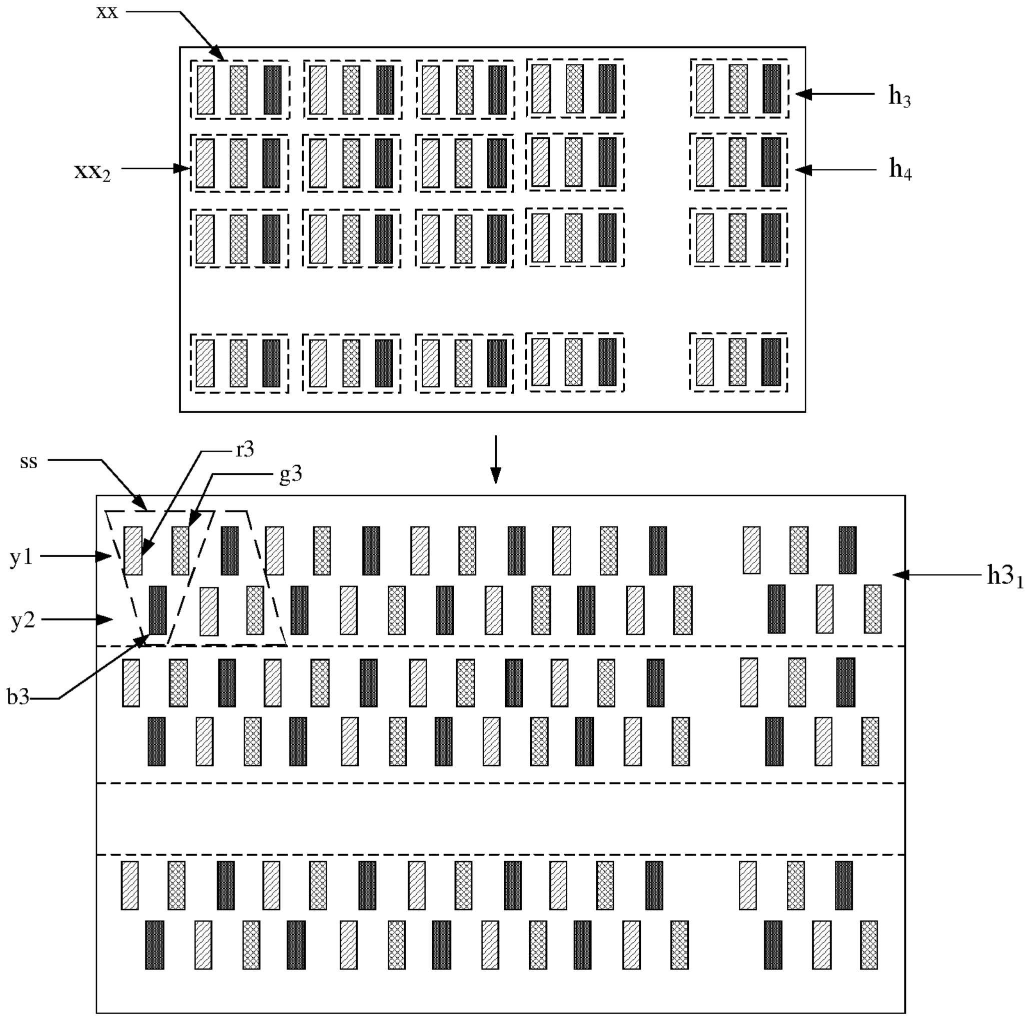
FIG. 3C is a schematic diagram illustrating an original image and a target BV3 image provided in an embodiment of the present disclosure.

For example, as shown in FIG. 3C, the pixel rows in the original image corresponding to the first pixel data set are the first pixel row $h_3$ and the second pixel row $h_4$, and the BV3 pixel row in the target BV3 image corresponding to the first pixel data set is the BV3 pixel row $h3_1$, the first column number of the pixel column in which the first real RGB pixel xx is arranged is 1, and then the BV3 pixel corresponding to the first real RGB pixel xx is the BV3 pixel ss in the BV3 pixel row $h3_1$ and in the BV3 pixel column having the second column number of 1.

At step b2, a first BV3 sub-pixel and a second BV3 sub-pixel are determined from the BV3 pixel corresponding to the first real RGB pixel, the first BV3 sub-pixel being in the first BV3 sub-pixel row, and the second BV3 sub-pixel being in the second BV3 sub-pixel row.

In the case shown in FIG. 3C, in the BV3 pixel ss, the red BV3 sub-pixel r3 and the green BV3 sub-pixel g3 are in the first sub-pixel row y1, and the blue BV3 sub-pixel b3 is in the second sub-pixel row y2. Thus the data converting apparatus may determine the red BV3 sub-pixel r3 and the green BV3 sub-pixel g3 to be the first BV3 sub-pixels and the blue BV3 sub-pixel b3 to be the second BV3 sub-pixel.

At step c2, when the first real RGB pixel is in the first pixel row, the real RGB sub-pixel having the same color as the first BV3 sub-pixel in the first real RGB pixel is determined to be an effective sub-pixel.

In the case shown in FIG. 3C, when the first real RGB pixel xx is in the first pixel row $h_3$ (as shown in FIG. 3C), the data converting apparatus may determine the red real RGB sub-pixel and the green real RGB sub-pixel in the first real RGB pixel xx that have the same colors as the red BV3 sub-pixel r3 and the green BV3 sub-pixel g3, respectively to be effective sub-pixels.

At step d2, when the first real RGB pixel is in the second pixel row, the real RGB sub-pixel having the same color as the second BV3 sub-pixel in the first real RGB pixel is determined to be an effective sub-pixel.

In the case shown in FIG. 3C, when the first real RGB pixel xx is in the second pixel row (not shown in FIG. 3C), the data converting apparatus may determine the blue real RGB sub-pixel having the same colors as the blue BV3 sub-pixel b3 in the first real RGB pixel xx to be an effective sub-pixel.

At step 304, for each of the plurality of pixel data sets, a pixel value of each BV3 pixel in the BV3 pixel row corresponding to the pixel data set in the target BV3 image is determined based on the pixel data set and the pixel values of the effective sub-pixels determined for the pixel data set.

Next, a process of step 304 in the embodiment of the disclosure is described by taking a process of determining the pixel value of the BV3 pixel corresponding to the first real RGB pixel in one of the first pixel row and the second pixel row as an example, and processing methods of other real RGB pixels may refer to the processing method of the first real RGB pixel. Each real RGB pixel may include a red real RGB sub-pixel, a green real RGB sub-pixel, and a blue real RGB sub-pixel. As an example, step 304 includes steps a3, b3, c3, d3, e3, f3, and g3.

At step a3, pixel values of a first red real RGB sub-pixel, a first green real RGB sub-pixel, and a first blue real RGB sub-pixel of the first real RGB pixel are acquired.

At step a3, the data converting apparatus may acquire the pixel value of each real RGB sub-pixel in the first real RGB pixel.

At step b3, pixel values of a second red real RGB sub-pixel, a second green real RGB sub-pixel, and a second blue real RGB sub-pixel of a second real RGB pixel in the same column as the first real RGB pixel are acquired from the first pixel data set.

At step b3, the data converting apparatus may acquire the pixel value of each real RGB sub-pixel in the second real RGB pixel. Here, the second real RGB pixel is one of the real RGB pixels associated with the first pixel data set, the second real RGB pixel and the first real RGB pixel are in one pixel column. Since the second real RGB pixel and the first real RGB pixel are in one pixel column and associated with one pixel data set, the second real RGB pixel and the first real RGB pixel correspond to one BV3 pixel.

As shown in FIG. 3C, the first real RGB pixel xx is in the first pixel row $h_3$ and in the pixel column having the first column number of 1, and the second real RGB pixel $xx_2$ is in the second pixel row $h_4$ and in the pixel column also having the first column number of 1.

At step c3, a target red sub-pixel value is calculated based on the pixel value of the first red real RGB sub-pixel and the pixel value of the second red real RGB sub-pixel by using a preset algorithm, and the target red sub-pixel value may indicate a combination of the pixel values of the first red real RGB sub-pixel and the second red real RGB sub-pixel (i.e., the red real RGB sub-pixels corresponding to one BV3 pixel).

It should be noted that the preset algorithm may be one of an averaging algorithm, a bi-linear algorithm, a bi-cubic algorithm and a polyfilter algorithm. Next, step c3 is described in an embodiment of the present disclosure by taking a case where the preset algorithm is the averaging algorithm as an example.

At step c3, the data converting apparatus may calculate the target red sub-pixel value according to the following formula:

$$r = \frac{r_1 + r_2}{2}$$

where r is the target red sub-pixel value, $r_1$ is the pixel value of the first red real RGB sub-pixel, and $r_2$ is the pixel value of the second red real RGB sub-pixel.

At step d3, a target green sub-pixel value is calculated based on the pixel value of the first green real RGB sub-pixel and the pixel value of the second green real RGB sub-pixel by using a preset algorithm, and the target green sub-pixel value may indicate a combination of the pixel values of the first green real RGB sub-pixel and the second green real RGB sub-pixel (i.e., the green real RGB sub-pixels corresponding to one BV3 pixel).

At step e3, a target blue sub-pixel value is calculated based on the pixel value of the first blue real RGB sub-pixel and the pixel value of the second blue real RGB sub-pixel by using a preset algorithm, and the target blue sub-pixel value may indicate a combination of the pixel values of the first blue real RGB sub-pixel and the second blue real RGB sub-pixel (i.e., the blue real RGB sub-pixels corresponding to one BV3 pixel).

Processes of steps d3 and e3 are the same as that of step c3, and are not repeatedly described in the embodiment of the present disclosure.

At step f3, a target effective sub-pixel is determined, and the target effective sub-pixel is an effective sub-pixel determined from the first real RGB pixel and the second real RGB pixel.

In practical applications, the target effective sub-pixel may include a red effective sub-pixel, a green effective sub-pixel, and a blue effective sub-pixel.

As shown in FIG. 3C, the first real RGB pixel xx is in the first pixel row $h_3$, and the data converting apparatus may determine the red real RGB sub-pixel and the green real RGB sub-pixel in the first real RGB pixel that have the same colors as the red BV3 sub-pixel r3 and the green BV3 sub-pixel g3, respectively to be effective sub-pixels. The second real RGB $xx_2$ is in the second pixel row $h_4$, and the data converting apparatus may determine the blue real RGB sub-pixel in the second real RGB pixel $xx_2$ having the same colors as the blue BV3 sub-pixel b3 to be an effective sub-pixel. Thus, the target effective sub-pixels determined at step f3 include the red real RGB sub-pixel and the green real RGB sub-pixel in the first real RGB pixel xx and the blue real RGB sub-pixel in the second real RGB pixel $xx_2$. The red real RGB sub-pixel and the green real RGB sub-pixel in the first real RGB pixel xx are a red effective sub-pixel and a green effective sub-pixel, respectively, and the blue real RGB sub-pixel in the second real RGB pixel $xx_2$ is a blue effective sub-pixel.

At step g3, the pixel value of the BV3 pixel that correspond to both the first real RGB pixel and the second real RGB pixel in the BV3 pixel row corresponding to the first pixel data set is calculated based on the target red sub-pixel value, the target green sub-pixel value, the target blue sub-pixel value, and the pixel values of the target effective sub-pixels.

In an embodiment of the present disclosure, the data converting apparatus may calculate the pixel value of each BV3 sub-pixel in the BV3 pixel that correspond to both the first real RGB pixel and the second real RGB pixel according to a first formula, a second formula, and a third formula, and the calculating process is as follows.

The pixel value of the red BV3 sub-pixel in the BV3 pixel corresponding to both the first real RGB pixel and the second real RGB pixel is calculated based on the target red sub-pixel value and the pixel value of the red effective sub-pixel by using the first formula, the first formula being:

$$RR_1=\alpha R_1+(1-\alpha)r.$$

The pixel value of the green BV3 sub-pixel in the BV3 pixel corresponding to both the first real RGB pixel and the second real RGB pixel is calculated based on the target green sub-pixel value and the pixel value of the green effective sub-pixel by using the second formula, the second formula being:

$$GG_1=\alpha G_1+(1-\alpha)g.$$

The pixel value of the blue BV3 sub-pixel in the BV3 pixel corresponding to both the first real RGB pixel and the second real RGB pixel is calculated based on the target blue sub-pixel value and the pixel value of the blue effective sub-pixel by using the third formula, the third formula being:

$$BB_1=\alpha B_1+(1-\alpha)b.$$

Here, $RR_1$ is the pixel value of the red BV3 sub-pixel in the BV3 pixel corresponding to both the first real RGB pixel and the second real RGB pixel, $GG_1$ is the pixel value of the green BV3 sub-pixel in the BV3 pixel corresponding to both the first real RGB pixel and the second real RGB pixel, $BB_1$ is the pixel value of the blue BV3 sub-pixel in the BV3 pixel corresponding to both the first real RGB pixel and the second real RGB pixel, $\alpha$ is a preset weight coefficient greater than 0 and less than 1, $R_1$ is the pixel value of the red effective sub-pixel, r is the target red sub-pixel value, $G_1$ is the pixel value of the green effective sub-pixel, g is the target green sub-pixel value, $B_2$ is the pixel value of the blue effective sub-pixel, and b is the target blue sub-pixel value.

At step 305, the target BV3 image is displayed on the BV3 display panel according to the pixel value of each BV3 pixel in the target BV3 image.

In practical applications, the converted target BV3 image may have the same resolution as the BV3 display panel of the data converting apparatus, that is, the numbers of BV3 pixel rows and BV3 pixel columns included in the target BV3 image are equal to the numbers of BV3 pixel rows and BV3 pixel columns included in the BV3 display panel, respectively. In this case, the target BV3 image can be displayed on the BV3 display panel directly according to the pixel value of each BV3 pixel in the target BV3 image.

In other cases, the converted target BV3 image may have a different resolution from the BV3 display panel of the data converting apparatus. For example, the number of BV3 pixel rows included in the target BV3 image may not be equal to the number of BV3 pixel rows included in the BV3 display panel. For example, the number of BV3 pixel columns included in the target BV3 image may not be equal to the number of BV3 pixel columns included in the BV3 display panel. In this case, the target BV3 image may be scaled such that the scaled target BV3 image has the same resolution as the BV3 display panel, and then the scaled target BV3 image can be displayed on the BV3 display panel according to the pixel value of each BV3 pixel in the scaled target BV3 image.

In summary, in the data converting method provided by the embodiments of the present disclosure, a plurality of pixel data sets are acquired from original image data applicable to a conventional real RGB display panel, each pixel data set including pixel value of each real RGB pixel in two adjacent pixel rows in an original image corresponding to the original image data, effective sub-pixels are determined from real RGB pixels corresponding to each of the above pixel data sets, and then a pixel value of each BV3 pixel in a target BV3 image to be generated is determined based on the pixel data set and pixel values of the effective sub-pixels determined for the pixel data set. In this way, the original image data applicable to the conventional real RGB display panel are converted into image data that can be applicable to the BV3 display panel, thereby improving backward compatibility of the BV3 display panel.

Figure 4:
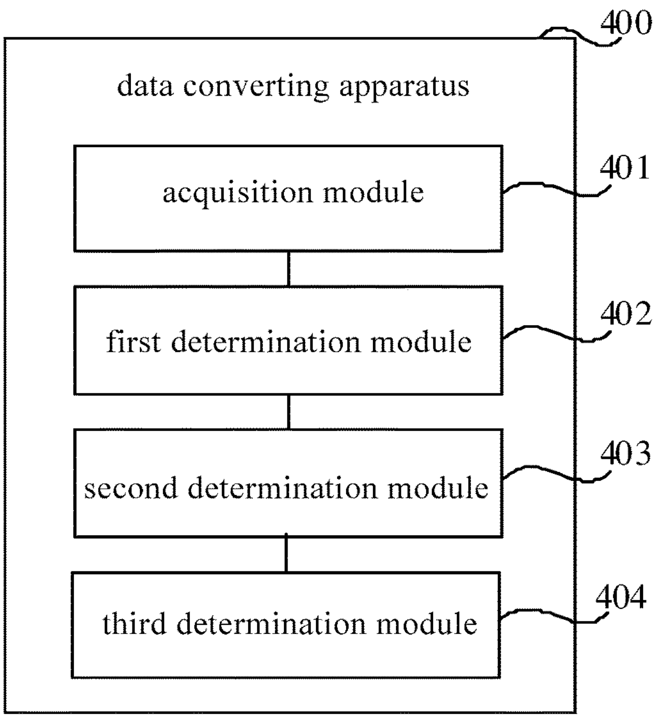
FIG. 4 is a block diagram of a data converting apparatus provided in an embodiment of the present disclosure.

FIG. 4 is a block diagram of a data converting apparatus 400 according to an exemplary embodiment. Referring to FIG. 4, the data converting apparatus 400 includes an acquisition module 401, a first determination module 402, a second determination module 403, and a third determination module 404.

The acquisition module 401 is configured to acquire a plurality of pixel data sets from original image data, each of the plurality of pixel data sets includes a pixel value of each real RGB pixel in two adjacent pixel rows among a plurality of pixel rows of an original image, the original image is an image displayed on a real RGB display panel according to the original image data, and the original image includes a plurality of real RGB pixels arranged in the plurality of pixel rows and a plurality of pixel columns according to an arrangement manner of real RGB pixels.

The first determination module 402 is configured to determine a BV3 pixel row corresponding to each of the plurality of pixel data sets from a plurality of BV3 pixel rows in a target BV3 image to be generated, wherein the target BV3 image to be generated includes a plurality of BV3 pixels arranged in the plurality of BV3 pixel rows and a plurality of BV3 pixel columns according to an arrangement manner of BV3 pixels, and each of the plurality of BV3 pixel rows corresponds to one of the plurality of pixel data sets.

The second determination module 403 is configured to determine, for each of the plurality of pixel data sets, effective sub-pixels from the real RGB pixels associated with the pixel data set according to the arrangement manner of the BV3 pixels in the BV3 pixel row corresponding to the pixel data set.

The third determination module 404 is configured to determine, for each of the plurality of pixel data sets, a pixel value of each BV3 pixel in the BV3 pixel row corresponding to the pixel data set in the target BV3 image based on the pixel data set and pixel values of the effective sub-pixels determined for the pixel data set.

Each of the plurality of pixel rows in the original image has a first row number for indicating an arrangement position of the pixel row in the plurality of pixel rows included in the original image, each of the plurality of BV3 pixel rows in the target BV3 image has a second row number for indicating an arrangement position of the BV3 pixel row in the plurality of BV3 pixel rows included in the target BV3 image, and the two adjacent pixel rows associated with each of the plurality of pixel data sets include a first pixel row whose first row number is an odd number and a second pixel row whose first row number is the first row number of the first pixel row plus one. In an embodiment of the present disclosure, the first determination module 402 is configured to: acquire the first row number of the second pixel row associated with the first pixel data set, the first pixel data set being any one of the plurality of pixel data sets; determine a target BV3 pixel row in the target BV3 image, the second row number of the target BV3 pixel row being equal to one half of the first row number of the second pixel row; and determine the target BV3 pixel row to be the BV3 pixel row corresponding to the first pixel data set.

The BV3 pixel row includes a plurality of BV3 pixels. The BV3 pixel row can be divided into a first BV3 sub-pixel row and a second BV3 sub-pixel row next to the first BV3 sub-pixel row, and each of the plurality of BV3 pixels includes a plurality of BV3 sub-pixels arranged in the first BV3 sub-pixel row and the second BV3 sub-pixel row. In an embodiment of the present disclosure, the second determination module 403 is configured to: determine, from the BV3 pixel row corresponding to the first pixel data set, a BV3 pixel corresponding to each of the real RGB pixels associated with the first pixel data set, the first pixel data set being any one of the plurality of pixel data sets; determine a first BV3 sub-pixel and a second BV3 sub-pixel from the BV3 pixel corresponding to the first real RGB pixel, the first BV3 sub-pixel being in the first BV3 sub-pixel row, the second BV3 sub-pixel being in the second BV3 sub-pixel row, and the first real RGB pixel being any one of the real RGB pixels associated with the first pixel data set; determine a real RGB sub-pixel in first the real RGB pixel having the same color as the first BV3 sub-pixel to be an effective sub-pixel when the first real RGB pixel is in the first pixel row; and determine a real RGB sub-pixel in the first real RGB pixel having the same color as the second BV3 sub-pixel to be an effective sub-pixel when the first real RGB pixel is in the second pixel row.

Each of the plurality of pixel columns in the original image has a first column number for indicating an arrangement position of the pixel column in the plurality of pixel columns included in the original image, and each of the plurality of BV3 pixel columns in the target BV3 image has a second column number for indicating an arrangement position of the BV3 pixel column in the plurality of BV3 pixel columns included in the target BV3 image. In an embodiment of the present disclosure, the second determination module 403 is configured to: determine the first column number of the pixel column in which the first real RGB pixel is arranged; determine a target BV3 pixel in the BV3 pixel row corresponding to the pixel data set, the second column number of the BV3 pixel column in which the target BV3 pixel is arranged being equal to the first column number of the pixel column in which the first real RGB pixel is arranged; and determine the target BV3 pixel to be the BV3 pixel corresponding to the first real RGB pixel.

In an embodiment of the present disclosure, the third determination module 404 is configured to:

acquire pixel values of a first red real RGB sub-pixel, a first green real RGB sub-pixel and a first blue real RGB sub-pixel of a first real RGB pixel, the first real RGB pixel being any one of the real RGB pixels associated with a first pixel data set, and the first pixel data set being any one the plurality of pixel data sets;

acquire pixel values of a second red real RGB sub-pixel, a second green real RGB sub-pixel and a second blue real RGB sub-pixel of a second real RGB pixel, the second real RGB pixel being one of the real RGB pixels associated with the first pixel data set and in the same pixel column as the first real RGB pixel;

calculate a target red sub-pixel value based on the pixel values of the first red real RGB sub-pixel and the second red real RGB sub-pixel using a preset algorithm;

calculate a target green sub-pixel value based on the pixel values of the first green real RGB sub-pixel and the second green real RGB sub-pixel using the preset algorithm;

calculate a target blue sub-pixel value based on the pixel values of the first blue real RGB sub-pixel and the second blue real RGB sub-pixel using the preset algorithm; and calculate the pixel value of the BV3 pixel corresponding to both the first real RGB pixel and the second real RGB pixel in the BV3 pixel row corresponding to the first pixel data set, based on the target red sub-pixel value, the target green sub-pixel value, the target blue sub-pixel value, and the pixel value of a target effective sub-pixel, the target effective sub-pixel being an effective sub-pixel determined from the first real RGB pixel and the second real RGB pixel.

In an embodiment of the present disclosure, the preset algorithm is one of an averaging algorithm, a bi-linear algorithm, a bi-cubic algorithm, and a polyfilter algorithm.

The target effective sub-pixel includes a red effective sub-pixel, a green effective sub-pixel, and a blue effective sub-pixel, and in an embodiment of the present disclosure, the third determination module 404 is configured to:

calculate the pixel value of the red BV3 sub-pixel in the BV3 pixel corresponding to both the first real RGB pixel and the second real RGB pixel based on the target red sub-pixel value and the pixel value of the red effective sub-pixel by using a first formula, the first formula being:

$$RR_1=\alpha R_1+(1-\alpha)r;$$

calculate the pixel value of the green BV3 sub-pixel in the BV3 pixel corresponding to both the first real RGB pixel and the second real RGB pixel based on the target green sub-pixel value and the pixel value of the green effective sub-pixel by using a second formula, the second formula being:

$$GG_1=\alpha G_1+(1-\alpha)g;$$

calculate the pixel value of the blue BV3 sub-pixel in the BV3 pixel corresponding to both the first real RGB pixel and the second real RGB pixel based on the target blue sub-pixel value and the pixel value of the blue effective sub-pixel by using a third formula, the third formula being:

$$BB_1=\alpha B_1+(1-\alpha)b;$$

where $RR_1$ is the pixel value of the red BV3 sub-pixel in the BV3 pixel corresponding to both the first real RGB pixel and the second real RGB pixel, $GG_1$ is the pixel value of the green BV3 sub-pixel in the BV3 pixel corresponding to both the first real RGB pixel and the second real RGB pixel, $BB_1$ is the pixel value of the blue BV3 sub-pixel in the BV3 pixel corresponding to both the first real RGB pixel and the second real RGB pixel, $\alpha$ is a preset weight coefficient greater than 0 and less than 1, $R_1$ is the pixel value of the red effective sub-pixel, r is the target red sub-pixel value, $G_1$ is the pixel value of the green effective sub-pixel, g is the target green sub-pixel value, $B_2$ is the pixel value of the blue effective sub-pixel, and b is the target blue sub-pixel value.

Figure 5:
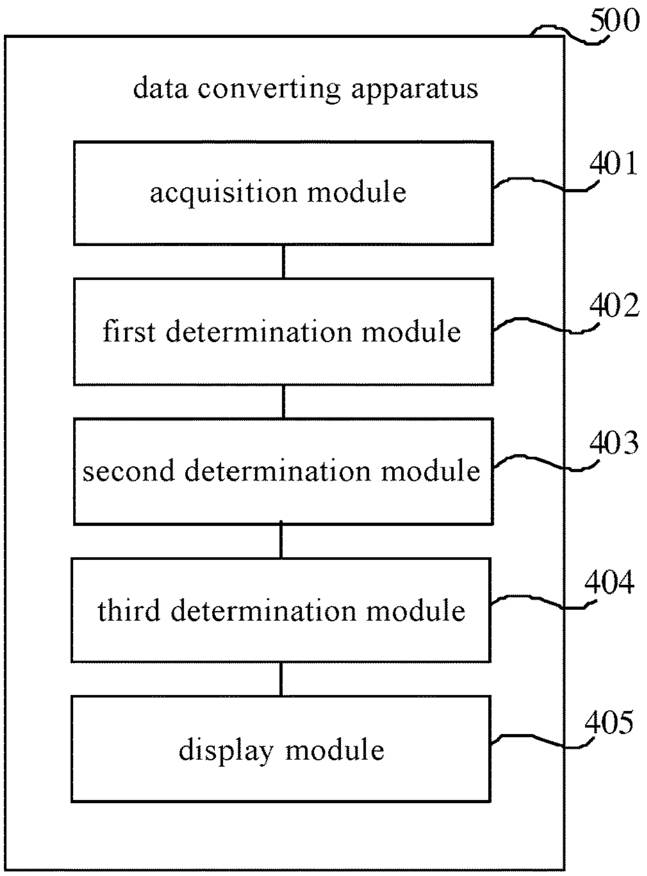
FIG. 5 is a block diagram of a data converting apparatus provided in an embodiment of the present disclosure.

As shown in FIG. 5, embodiments of the present disclosure further provide another data converting apparatus 500, which further includes a display device 405 in addition to the modules of the data converting apparatus 400.

The display device 405 is configured to display the target BV3 image on a BV3 display panel according to the pixel value of each BV3 pixel in the target BV3 image. The display device 405 may be any device that can display an image according to image data including pixel values, such as a display, a display panel, etc.

In summary, in the data converting apparatus provided by the embodiments of the present disclosure, a plurality of pixel data sets are acquired from original image data applicable to a conventional real RGB display panel, each pixel data set including a pixel value of each real RGB pixel in two adjacent pixel rows in an original image corresponding to the original image data, effective sub-pixels are determined from real RGB pixels corresponding to each of the above pixel data sets, and then a pixel value of each BV3 pixel in a target BV3 image to be generated is determined based on the pixel data set and pixel values of the effective sub-pixels determined for the pixel data set. In this way, the original image data applicable to the conventional real RGB display panel are converted into image data that can be applicable to the BV3 display panel, thereby improving backward compatibility of the BV3 display panel.

It should be noted that how the data converting apparatus provided in the embodiments performs data conversion is described by taking the above division of functional modules as an example. In practical applications, the functions may be achieved by different functional modules as required, that is, the internal structure of the apparatus may be divided into different functional modules to complete all or part of the functions described above. In addition, the embodiments of the data converting apparatus and the data converting method in the foregoing disclosure belong to a same concept, and the specific implementing process of the data converting apparatus may refer to the description of the embodiments of the method and are not repeatedly described herein.

It should be noted that the apparatus according to an embodiment of the present disclosure may be implemented as a memory and a processor coupled to each other. The memory stores computer-executable instructions which can be executed by the processor to instruct the processor to perform the functions of the acquisition module 401, the first determination module 402, the second determination module 403, and the third determination module 404. Examples of suitable memory include, but are not limited to, a magnetic disc or a magnetic tape, an optical storage media such as compact disc (CD) or DVD (Digital Versatile Disc), a flash memory, and other non-transitory media. Optionally, the memory is a non-transitory memory.

Needless to say, the apparatus according to the embodiments of the present disclosure is not limited thereto, and may also be implemented as a combination of software and hardware in other forms.

In an exemplary embodiment, there is further provided a computer-readable storage medium in which a computer program is stored. When the computer program in the computer-readable storage medium is executed by a processor, a data converting method can be executed, for example, the method may include: acquiring a plurality of pixel data sets from original image data, each of the plurality of pixel data sets including a pixel value of each real RGB pixel in two adjacent pixel rows among a plurality of pixel rows of an original image, the original image being an image displayed on a real RGB display panel according to the original image data, and the original image including a plurality of real RGB pixels arranged in the plurality of pixel rows and a plurality of pixel columns according to an arrangement manner of real RGB pixels; determining a BV3 pixel row corresponding to each of the plurality of pixel data sets from a plurality of BV3 pixel rows in a target BV3 image to be generated, the target BV3 image to be generated including a plurality of BV3 pixels arranged in the plurality of BV3 pixel rows and a plurality of BV3 pixel columns according to an arrangement manner of BV3 pixels, and each of the plurality of BV3 pixel rows corresponding to one of the plurality of pixel data sets; for each of the plurality of pixel data sets, determining effective sub-pixels from the real RGB pixels associated with the pixel data set according to the arrangement manner of the BV3 pixels in the BV3 pixel row corresponding to the pixel data set; and for each of the plurality of pixel data sets, determining a pixel value of each BV3 pixel in the BV3 pixel row corresponding to the pixel data set in the target BV3 image based on the pixel data set and pixel values of the effective sub-pixels determined for the pixel data set.

Those of ordinary skill in the art could understand that all or part of the steps in the above embodiments may be implemented by hardware, or by instructing a relevant hardware using a program and the program may be stored in a computer-readable storage medium. The storage medium may be a read-only memory such as a magnetic disk, an optical disk or the like.

The foregoing descriptions are merely exemplary embodiments of the present disclosure and are not intended to limit the present disclosure. Any modification, equivalent replacement, and improvement made within the spirit and principle of the present disclosure shall be encompassed in the protection scope of the present disclosure.

The invention claimed is:

1. An image converting method, comprising:

obtaining an original image by a processor, the original image comprising a plurality of sub-pixels arranged in a rectangle array, the plurality of sub-pixels constituting a plurality of real RGB pixels arranged in a plurality of pixel rows and a plurality of pixel columns, and each of the real RGB pixels comprising three adjacent sub-pixels in one row of the plurality of sub-pixels;

dividing the original image into a plurality of pixel sets by the processor, wherein each of the plurality of pixel sets comprises two real RGB pixels in two adjacent pixel rows among the plurality of pixel rows and in one pixel column among the plurality of the pixel columns; and for each of the plurality of pixel sets, converting the original image into a target BV3 image by the processor, wherein the target BV3 image comprises a plurality of sub-pixels arranged in a BV3 array in which even rows of sub-pixels and odd rows of sub-pixels are staggered, the sub-pixels of the target BV3 image constitute a plurality of BV3 pixels arranged in a plurality of BV3 pixel rows and a plurality of BV3 pixel columns, each of the BV3 pixel rows comprises a first sub-pixel row and a second sub-pixel row of the target BV3 image that are adjacent to each other, and each of the BV3 pixels comprises two adjacent sub-pixels in one of a first and a second sub-pixel rows of the BV3 pixel row in which the BV3 pixel is located, and one sub-pixels in the other of the first and the second sub-pixel rows of the BV3 pixel row in which the BV3 pixel is located, the two adjacent sub-pixels and the one sub-pixels being arranged in a delta shape, wherein converting the original image into the target BV3 image comprises for each of the pixel sets, determining, by the processor, a BV3 pixel corresponding to the pixel set from a plurality of BV3 pixels;

for each of the plurality of pixel sets, determining, by the processor, effective sub-pixels from the sub-pixels of the real RGB pixels of the pixel set according to an arrangement manner of the sub pixels of the BV3 pixel corresponding to the pixel set; and for each of the plurality of pixel sets, determining, by the processor, a pixel value of the BV3 pixel corresponding to the pixel set in the target BV3 image, based on pixel values of the effective sub-pixels determined for the pixel set.

2. The method of claim 1, wherein the plurality of pixel rows in the original image and the plurality of BV3 pixel rows in the target BV3 image are sequentially numbered, respectively, each of the plurality of pixel rows in the original image has a first row number for indicating an arrangement position of the pixel row in the plurality of pixel rows of the original image, each of the plurality of BV3 pixel rows in the target BV3 image has a second row number for indicating an arrangement position of the BV3 pixel row in the plurality of BV3 pixel rows of the target BV3 image, and the two adjacent pixel rows associated with each of the plurality of pixel sets comprise a first pixel row whose first row number is an odd number and a second pixel row whose first row number is the first row number of the first pixel row plus one, and the step of determining the BV3 pixel corresponding to the pixel set from the plurality of BV3 pixels comprises: for each of the plurality of pixel sets, acquiring the first row number of the second pixel row associated with the pixel set;

determining, in the target BV3 image, a target BV3 pixel row whose second row number is equal to one half of the first row number of the second pixel row;

assigning the target BV3 pixel row to be the BV3 pixel row corresponding to the pixel set; and determining the BV3 pixel corresponding to the pixel set from among the BV3 pixel row corresponding to the pixel set.

3. The method of claim 1, wherein the two adjacent pixel rows associated with each of plurality of pixel data sets comprises a first pixel row and a second pixel row whose first row number is the first row number of the first pixel row plus one, the step of determining the effective sub-pixels from the sub-pixels of the real RGB pixels of the pixel set according to the arrangement manner of the sub-pixels of the BV3 pixel corresponding to the pixel set comprises:

determining, from a BV3 pixel corresponding to the real RGB pixel, a sub-pixel in the first BV3 sub-pixel row to be a first BV3 sub-pixel and a sub-pixel in the second BV3 sub-pixel row to be a second BV3 sub-pixel;

for a real RGB pixel in the first pixel row of the real RGB pixels of the pixel set, determining a sub-pixel in the real RGB pixel having a same color as the first BV3 sub-pixel to be one of the effective sub-pixels; and for a real RGB pixel in the second pixel row of the real RGB pixels of the pixel set, determining a sub-pixel in the real RGB pixel having a same color as the second BV3 sub-pixel to be one of the effective sub-pixels.

4. The method of claim 3, wherein the plurality of pixel columns in the original image and the plurality of BV3 pixel columns in the target BV3 image are sequentially numbered, respectively, each of the plurality of pixel columns in the original image has a first column number for indicating an arrangement position of the pixel column in the plurality of pixel columns of the original image, and each of the plurality of BV3 pixel columns in the target BV3 image has a second column number for indicating an arrangement position of the BV3 pixel column in the plurality of BV3 pixel columns of the target BV3 image, and a step of determining a BV3 pixel corresponding to each of the real RGB pixels of the pixel set from the BV3 pixel row corresponding to the pixel set comprises:

determining the first column number of the pixel column in which the real RGB pixels of the pixel set is arranged;

determining a target BV3 pixel from the BV3 pixel row corresponding to the pixel set, the second column number of the BV3 pixel column in which the target BV3 pixel is arranged being equal to the first column number of the pixel column in which the real RGB pixels of the pixel set is arranged; and assigning the target BV3 pixel to be the BV3 pixel corresponding to the real RGB pixel.

5. The method of claim 1, wherein each of the plurality of real RGB pixels comprises a red sub-pixel, a green sub-pixel, and a blue sub-pixel, and the two adjacent pixel rows associated with each of the plurality of pixel sets comprise a first pixel row and a second pixel row whose first row number is a first row number of the first pixel row plus one, and the step of determining the pixel value of the BV3 pixel corresponding to the pixel set in the target BV3 image based on the pixel values of the effective sub-pixels determined for the pixel data set comprises:

acquiring pixel values of the red sub-pixel, the green sub-pixel and the blue sub-pixel of a first real RGB pixel of the pixel set in the first pixel row;

acquiring pixel values of the red sub-pixel, the green sub-pixel and the blue sub-pixel of a second real RGB pixel of the pixel set in the second pixel row;

calculating a target red sub-pixel value based on the pixel values of the red sub-pixels of the first real RGB pixel and the second real RGB pixel using a preset algorithm;

calculating a target green sub-pixel value based on the pixel values of the green sub-pixels of the first real RGB pixel and the second real RGB pixel using the preset algorithm;

calculating a target blue sub-pixel value based on the pixel values of the blue sub-pixels of the first real RGB pixel and the second real RGB pixel using the preset algorithm; and calculating a pixel value of the BV3 pixel corresponding to the pixel set, based on the target red sub-pixel value, the target green sub-pixel value, the target blue sub-pixel value, and pixel values of target effective sub-pixels, the target effective sub-pixels being the effective sub-pixels determined from the first real RGB pixel and the second real RGB pixel.

6. The method of claim 5, wherein the preset algorithm is one of an averaging algorithm, a bi-linear algorithm, a bi-cubic algorithm, and a polyfilter algorithm.

7. The method of claim 5, wherein the target effective sub-pixels comprise a red effective sub-pixel, a green effective sub-pixel, and a blue effective sub-pixel, and the step of calculating the pixel value of the BV3 pixel corresponding to the pixel set based on the target red sub-pixel value, the target green sub-pixel value, the target blue sub-pixel value, and the pixel values of the target effective sub-pixels comprises:

calculating a pixel value of the red sub-pixel of the BV3 pixel corresponding to the pixel set based on the target red sub-pixel value and a pixel value of the red effective sub-pixel by using a first formula, the first formula being:

$$RR_1=\alpha R_1+(1-\alpha)r;$$

calculating a pixel value of the green sub-pixel of the BV3 pixel corresponding to the pixel set based on the target green sub-pixel value and a pixel value of the green effective sub-pixel by using a second formula, the second formula being:

$$GG_1=\alpha G_1+(1-\alpha)g;$$

calculating a pixel value of the blue sub-pixel of the BV3 pixel corresponding to the pixel set based on the target blue sub-pixel value and a pixel value of the blue effective sub-pixel by using a third formula, the third formula being:

$$BB_1=\alpha B_1+(1-\alpha)b;$$

where $RR_1$ is the pixel value of the red sub-pixel in the BV3 pixel corresponding to the pixel set, $GG_1$ is the pixel value of the green sub-pixel in the BV3 pixel corresponding to the pixel set, $BB_1$ is the pixel value of the blue sub-pixel in the BV3 pixel corresponding to the pixel set, $\alpha$ is a preset weight coefficient greater than 0 and less than 1, $R_1$ is the pixel value of the red effective sub-pixel, r is the target red sub-pixel value, $G_1$ is the pixel value of the green effective sub-pixel, g is the target green sub-pixel value, $B_2$ is the pixel value of the blue effective sub-pixel, and b is the target blue sub-pixel value.

8. The method of claim 1, wherein after the step of converting, for each of the plurality of pixel sets, the original image into a target BV3 image by the processor, the method further comprises:

displaying the target BV3 image on a BV3 display panel.

9. An image converting apparatus, comprising:

a memory; and a processor coupled to the memory, wherein the memory stores computer-executable instructions which are capable of being executed by the processor to instruct the processor to:

obtaining an original image by a processor, the original image comprising a plurality of sub-pixels arranged in a rectangle array, the plurality of sub-pixels constituting a plurality of real RGB pixels arranged in a plurality of pixel rows and a plurality of pixel columns, and each of the real RGB pixels comprising three adjacent sub-pixels in one row of the plurality of sub-pixels, dividing the original image into a plurality of pixel sets by the processor, wherein each of the plurality of pixel sets comprises two real RGB pixels in two adjacent pixel rows among the plurality of pixel rows and in one pixel column among the plurality of the pixel columns; and for each of the plurality of pixel sets, converting the original image into a target BV3 image by the processor, wherein the target BV3 image comprises a plurality of sub-pixels arranged in a BV3 array in which even rows of sub-pixels and odd rows of sub-pixels are staggered, the sub-pixels of the target BV3 image constitute a plurality of BV3 pixels arranged in a plurality of BV3 pixel rows and a plurality of BV3 pixel columns, each of the BV3 pixel rows comprises a first sub-pixel row and a second sub-pixel row of the target BV3 image that are adjacent to each other, and each of the BV3 pixels comprises two adjacent sub-pixels in one of a first and a second sub-pixel rows of the BV3 pixel row in which the BV3 pixel is located, and one sub-pixels in the other of the first and the second sub-pixel rows of the BV3 pixel row in which the BV3 pixel is located, the two adjacent sub-pixels and the one sub-pixels being arranged in a delta shape, wherein converting the original image into the target BV3 image comprises for each of the pixel sets, determining, by the processor, a BV3 pixel corresponding to the pixel set from a plurality of BV3 pixels;

for each of the plurality of pixel sets, determining, by the processor, effective sub-pixels from the sub-pixels of the real RGB pixels of the pixel set according to an arrangement manner of the sub pixels of the BV3 pixel corresponding to the pixel set; and for each of the plurality of pixel sets, determining, by the processor, a pixel value of the BV3 pixel corresponding to the pixel set in the target BV3 image, based on pixel values of the effective sub-pixels determined for the pixel set.

10. The apparatus of claim 9, wherein the plurality of pixel rows in the original image and the plurality of BV3 pixel rows in the target BV3 image are sequentially numbered, respectively, each of the plurality of pixel rows in the original image has a first row number for indicating an arrangement position of the pixel row in the plurality of pixel rows of the original image, each of the plurality of BV3 pixel rows in the target BV3 image has a second row number for indicating an arrangement position of the BV3 pixel row in the plurality of BV3 pixel rows of the target BV3 image, and the two adjacent pixel rows associated with each of the plurality of pixel sets comprise a first pixel row whose first row number is an odd number and a second pixel row whose first row number is the first row number of the first pixel row plus one, and the processor executes the computer-executable instructions to execute the step of determining the BV3 pixel corresponding to each of the plurality of pixel sets, comprising: for each of the plurality of pixel sets, acquiring the first row number of the second pixel row associated with the pixel set;

determining, in the target BV3 image, a target BV3 pixel row whose second row number of the target BV3 pixel row is equal to one half of the first row number of the second pixel row;

assigning the target BV3 pixel row to be the BV3 pixel row corresponding to the pixel set; and determining the BV3 pixel corresponding to the pixel set from among the BV3 pixel row corresponding to the pixel set.

11. The apparatus of claim 9, wherein the two adjacent pixel rows associated with each of plurality of pixel data sets comprising a first pixel row and a second pixel row whose first row number is the first row number of the first pixel row plus one, the processor executes the computer-executable instructions to execute the step of determining the effective sub-pixels, comprising:

determining, from a BV3 pixel corresponding to a real RGB pixel, a sub-pixel in the first BV3 sub-pixel row to be a first BV3 sub-pixel and a sub-pixel in the second BV3 sub-pixel row to be a second BV3 sub-pixel;

for a real RGB pixel in the first pixel row of the real RGB pixels of the pixel set, determining a sub-pixel in the real RGB pixel having a same color as the first BV3 sub-pixel to be one of the effective sub-pixels; and for a real RGB pixel in the second pixel row of the real RGB pixels of the pixel set, determining a sub-pixel in the real RGB pixel having a same color as the second BV3 sub-pixel to be one of the effective sub-pixels.

12. The apparatus of claim 11, wherein the plurality of pixel columns in the original image and the plurality of BV3 pixel columns in the target BV3 image are sequentially numbered, respectively, each of the plurality of pixel columns in the original image has a first column number for indicating an arrangement position of the pixel column in the plurality of pixel columns of the original image, and each of the plurality of BV3 pixel columns in the target BV3 image has a second column number for indicating an arrangement position of the BV3 pixel column in the plurality of BV3 pixel columns of the target BV3 image, and the processor executes the computer-executable instructions to execute a step of determining a BV3 pixel corresponding to each of the real RGB pixels of the pixel set, comprising:

determining the first column number of the pixel column in which the real RGB pixels of the pixel set is arranged;

determining a target BV3 pixel from the BV3 pixel row corresponding to the pixel set, the second column number of the BV3 pixel column in which the target BV3 pixel is arranged being equal to the first column number of the pixel column in which the real RGB pixels of the pixel set is arranged; and assigning the target BV3 pixel to be the BV3 pixel corresponding to the real RGB pixel.

13. The apparatus of claim 9, wherein each of the plurality of real RGB pixels comprises a red sub-pixel, a green sub-pixel, and a blue sub-pixel, and the two adjacent pixel rows associated with each of the plurality of pixel sets comprise a first pixel row and a second pixel row whose first row number is a first row number of the first pixel row plus one, and the processor executes the computer-executable instruction to execute the step of determining the pixel value of the BV3 pixel corresponding to the pixel set, comprising:

acquiring pixel values of the red sub-pixel, the green sub-pixel and the blue sub-pixel of a first real RGB pixel of the pixel set in the first pixel row;

acquiring pixel values of the red sub-pixel, the green sub-pixel and the blue sub-pixel of a second real RGB pixel of the pixel set in the second pixel row;

calculating a target red sub-pixel value based on the pixel values of the red sub-pixels of the first real RGB pixel and the second real RGB pixel using a preset algorithm;

calculating a target green sub-pixel value based on the pixel values of the green sub-pixels of the first real RGB pixel and the second real RGB pixel using the preset algorithm;

calculating a target blue sub-pixel value based on the pixel values of the blue sub-pixels of the first real RGB pixel and the second real RGB pixel using the preset algorithm; and calculating a pixel value of the BV3 pixel corresponding to the pixel set, based on the target red sub-pixel value, the target green sub-pixel value, the target blue sub-pixel value, and pixel values of target effective sub-pixels, the target effective sub-pixels being the effective sub-pixels determined from the first real RGB pixel and the second real RGB pixel.

14. The apparatus of claim 13, wherein the preset algorithm is one of an averaging algorithm, a bi-linear algorithm, a bi-cubic algorithm, and a polyFilter algorithm.

15. The apparatus of claim 13, wherein the target effective sub-pixels comprise a red effective sub-pixel, a green effective sub-pixel, and a blue effective sub-pixel, and the processor executes the computer-executable instruction to execute the step of calculating the pixel value of the BV3 pixel corresponding to the pixel set, comprising:

calculating a pixel value of the red sub-pixel of the BV3 pixel corresponding to the pixel set based on the target red sub-pixel value and a pixel value of the red effective sub-pixel by using a first formula, the first formula being:

$$RR_1=\alpha R+(1-\alpha)r;$$

calculating a pixel value of the green sub-pixel of the BV3 pixel corresponding to the pixel set based on the target green sub-pixel value and a pixel value of the green effective sub-pixel by using a second formula, the second formula being:

$$GG_1=\alpha G_1+(1-\alpha)g;$$

calculating a pixel value of the blue sub-pixel of the BV3 pixel corresponding to the pixel set based on the target blue sub-pixel value and a pixel value of the blue effective sub-pixel by using a third formula, the third formula being:

$$BB_1=\alpha B_1+(1-\alpha)b;$$

where $RR_1$ is the pixel value of the red sub-pixel in the BV3 pixel corresponding to the pixel set, $GG_1$ is the pixel value of the green sub-pixel in the BV3 pixel corresponding to the pixel set, $BB_1$ is the pixel value of the blue sub-pixel in the BV3 pixel corresponding to the pixel set, α is a preset weight coefficient greater than 0 and less than 1, $R_1$ is the pixel value of the red effective sub-pixel, r is the target red sub-pixel value, $G_1$ is the pixel value of the green effective sub-pixel, g is the target green sub-pixel value, $B_2$ is the pixel value of the blue effective sub-pixel, and b is the target blue sub-pixel value.

16. The apparatus of claim 9, further comprising:

a display device configured to display the target BV3 image on a BV3 display panel according to the pixel value of each BV3 pixel in the target BV3 image.

17. A computer-readable storage medium, wherein a computer program is stored in the computer-readable storage medium, and the stored computer program is capable of being executed by a processor to implement the data converting method of claim 1.

* * * * *